(12) United States Patent
Fukushiro et al.

(10) Patent No.: US 11,040,709 B2
(45) Date of Patent: Jun. 22, 2021

(54) ELECTRICALLY DRIVEN VEHICLE

(71) Applicant: TOYOTA JIDOSHA KABUSHIKI KAISHA, Toyota (JP)

(72) Inventors: Eiji Fukushiro, Toyota (JP); Keiji Tajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 16/386,808

(22) Filed: Apr. 17, 2019

(65) Prior Publication Data

US 2019/0322266 A1    Oct. 24, 2019

(30) Foreign Application Priority Data

Apr. 20, 2018   (JP) .............................. JP2018-081413
Mar. 13, 2019   (JP) .............................. JP2019-045553

(51) Int. Cl.
| | |
|---|---|
| B60W 20/00 | (2016.01) |
| B60K 6/52 | (2007.10) |
| B60K 6/26 | (2007.10) |
| B60K 17/356 | (2006.01) |

(52) U.S. Cl.
CPC ............... *B60W 20/00* (2013.01); *B60K 6/26* (2013.01); *B60K 6/52* (2013.01); *B60K 17/356* (2013.01); *B60Y 2200/91* (2013.01); *B60Y 2200/92* (2013.01); *B60Y 2300/91* (2013.01); *B60Y 2400/82* (2013.01)

(58) Field of Classification Search
CPC ............. B60W 20/00; B60W 2540/10; B60W 2520/10; B60W 10/06; B60W 10/08; B60W 30/18109; B60K 6/52; B60K 6/26; B60K 17/356; B60Y 2300/91; B60Y 2200/91; B60Y 2200/92; B60Y 2400/82; Y02T 10/72; Y02T 10/62
See application file for complete search history.

(56) References Cited

U.S. PATENT DOCUMENTS

| | | | |
|---|---|---|---|
| 2011/0276211 A1* | 11/2011 | Teraya .................... | B60K 6/445 701/22 |
| 2016/0129810 A1* | 5/2016 | Takahashi ....... | B60W 30/18109 701/22 |

FOREIGN PATENT DOCUMENTS

JP         2012-196082 A    10/2012

* cited by examiner

*Primary Examiner* — Marthe Y Marc-Coleman
(74) *Attorney, Agent, or Firm* — Sughrue Mion, PLLC

(57) ABSTRACT

There is provided an electrically driven vehicle equipped with a first motor configured to output a torque to one of front wheels and rear wheels and with a second motor configured to output a torque to the other of the front wheels and the rear wheels. When a torque of a negative value is required as a required torque that is required for driving, the second motor is controlled to output the torque with a lower limit torque of a positive value as a lower limit, and the first motor is controlled such that the electrically driven vehicle is driven with the required torque.

5 Claims, 7 Drawing Sheets

ELECTRICALLY DRIVEN VEHICLE

CROSS-REFERENCE TO RELATED APPLICATION

This application claims priority to two Japanese Patent Applications No. 2018-081413 filed on Apr. 20, 2018, and No. 2019-045553 filed on Mar. 13, 2019 the contents of which is incorporated herein by reference.

TECHNICAL FIELD

The present disclosure relates to an electrically driven vehicle provided with a first motor configured to output a driving force to one of front wheels and rear wheels and a second motor configured to output a driving force to the other of the front wheels and the rear wheels.

BACKGROUND

In response to a change of a required torque from a torque for deceleration (a negative torque) to a torque for acceleration (a positive torque), a proposed configuration of the electrically driven vehicle changes the required torque by a gradual changing process while the required torque is in a predetermined torque range including a value 0 (as described in, for example, JP 2012-196082A). This electrically driven vehicle gradually changes the torque when the required torque has a change of the sign, in order to suppress the occurrence of a torque shock that is likely to occur due to backlash of a differential gear.

CITATION LIST

Patent Literature

PTL 1: JP2012-196082A

SUMMARY

The electrically driven vehicle described above, however, has a delay in rise of a driving force in response to an accelerator operation when the torque is gradually changed by the gradual changing process. In an electrically driven vehicle provided with a motor as the power source for driving, there is generally high expectation for the quick acceleration response to an accelerator operation. A delay in rise of the driving force accordingly makes the driver feel uncomfortable.

A main object of the electrically driven vehicle of the present disclosure is to improve the acceleration response to an accelerator operation.

The electrically driven vehicle of the present disclosure employs the following aspects, in order to achieve the main object described above.

The present disclosure directed to an electrically driven vehicle. The electrically driven vehicle includes a first motor configured to output a driving force to one of front wheels and rear wheels, a second motor configured to output a driving force to the other of the front wheels and the rear wheels, a power storage device configured to transmit electric power to and from the first motor and the second motor and a control device configured to control the first motor and the second motor such that the electrically driven vehicle is driven with a required driving force that is required for driving. When a negative driving force is required as the required driving force, the control device performs driving force offset control to control the second motor with a predetermined positive driving force as a lower limit and to control the first motor such that the electrically driven vehicle is driven with the required driving force.

The electrically driven vehicle of this aspect is provided with the first motor configured to output the driving force to one of the front wheels and the rear wheels and with the second motor configured to output the driving force to the other of the front wheels and the rear wheels. In response to a request for a negative driving force (braking force) as the required driving force, the electrically driven vehicle of this aspect performs the driving force offset control to control the second motor with the predetermined positive driving force as the lower limit and to control the first motor such that the electrically driven vehicle is driven with the required braking force. When the required driving force is changed from a negative driving force to a positive driving force, this configuration does not require a gradual change process to eliminate a backlash of a gear between the second motor and the wheels and allows for a quick rise of the driving force output from the second motor. As a result, this improves the acceleration response to an accelerator operation. This configuration also enables the negative driving force (braking force) output from the first motor to respond to a negative required driving force.

DESCRIPTION OF EMBODIMENTS

The following describes some aspects of the present disclosure with reference to embodiments.

Figure 1:
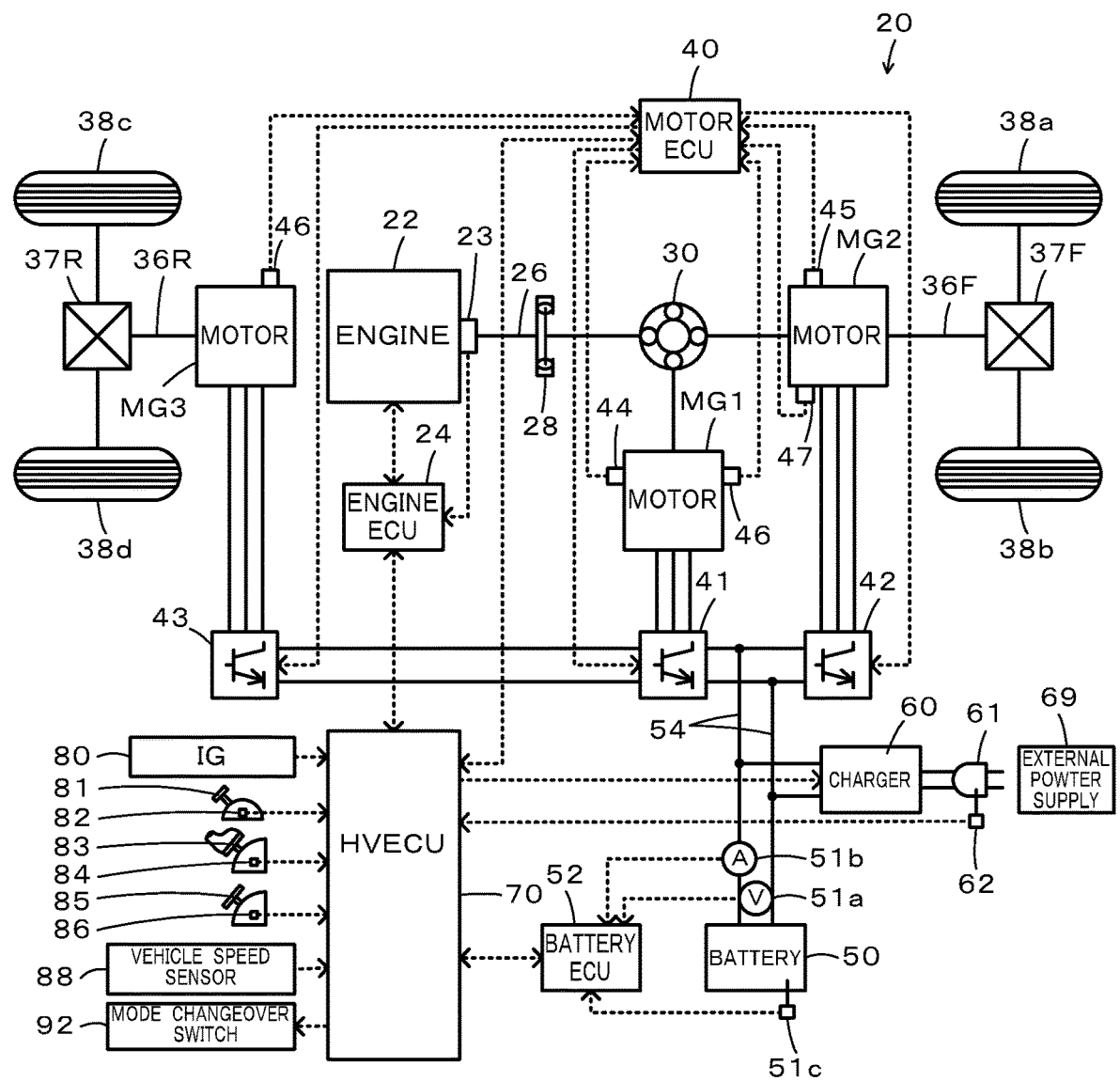
FIG. 1 is a configuration diagram illustrating the schematic configuration of an electrically driven vehicle according to one embodiment of the present disclosure.

FIG. 1 is a configuration diagram illustrating the schematic configuration of an electrically driven vehicle 20 according to one embodiment of the present disclosure. As illustrated, the electrically driven vehicle 20 of the embodiment includes an engine 22, a planetary gear 30, motors MG1, MG2 and MG3, inverters 41, 42 and 43, a battery 50, a charger 60 and a hybrid electronic control unit (hereinafter referred to as "HVECU") 70.

The engine 22 is configured as an internal combustion engine that outputs power by using, for example, gasoline or light oil as a fuel. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36F coupled with front wheels 38a and 38b via a differential gear 37F. The planetary gear 30 further includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 is configured as, for example, a synchronous generator motor and has a rotor that is connected with the driveshaft 36F. The motor MG3 is configured as, for example, a synchronous generator motor and has a rotor that is connected with a driveshaft 36R coupled with rear wheels 38c and 38d via a differential gear 37R. The inverters 41, 42 and 43 are connected with the battery 50 via power lines 54. A motor electronic control unit (hereinafter referred to as "motor ECU") 40 performs switching control of a plurality of switching elements (not shown) included in the inverters 41, 42 and 43 so as to rotate and drive the motors MG1, MG2 and MG3.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1, MG2 and MG3, for example, rotational positions θm1, θm2 and θm3 from rotational position detection sensors 44, 45 and 46 respectively configured to detect the rotational positions of the respective rotors of the motors MG1, MG2 and MG3 and a motor temperature tm2 from a temperature sensor 47 configured to detect the temperature of the motor MG2, are input into the motor ECU 40 via the input port. The motor ECU 40 outputs, for example, switching control signals to the plurality of switching elements (not shown) included in the inverters 41, 42 and 43 via the output port. The motor ECU 40 is connected with the HVECU 70 via the respective communication ports. The motor ECU 40 calculates rotation speeds Nm1, Nm2 and Nm3 of the motors MG1, MG2 and MG3, based on the rotational positions θm1, θm2 and θm3 input from the rotational position detection sensors 44, 45 and 46.

The battery 50 is configured by, for example, a lithium ion rechargeable battery or a nickel metal hydride battery. This battery 50 is connected with the inverters 41 and 42 via the power lines 54 as described above. The battery 50 is under management by a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50, are input into the battery ECU 52 via the input port. The battery ECU 52 is connected with the HVECU 70 via the respective communication ports. The battery ECU 52 calculates a state of charge SOC, based on an integrated value of the battery current Ib input from the current sensor 51b. The state of charge SOC denotes a ratio of a power capacity dischargeable from the battery 50 to the overall capacity of the battery 50. The battery ECU 52 also calculates an input limit Win and an output limit Wout as maximum values of electric power chargeable into and dischargeable from the battery 50, based on the calculated state of charge SOC and the battery temperature Tb from the temperature sensor 51c.

The charger 60 is connected with the power lines 54 and is configured to perform external charging that charges the battery 50 by using electric power from an external power supply 69 such as a household power supply or an industrial power supply when a power plug 61 is connected with the external power supply 69 at a charging point, for example, at home or at a charging station.

The HVECU 70 is configured as a CPU-based microprocessor and includes a ROM configured to store processing programs, a RAM configured to temporarily store data, input/output ports and a communication port, in addition to the CPU, although not being illustrated. The signals input into the HVECU 70 include, for example, an ignition signal from an ignition switch 80, a shift position SP from a shift position sensor 82 configured to detect an operating position of a shift lever 81, an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85. The input signals also include, for example, a vehicle speed V from a vehicle speed sensor 88, a switch signal SWC from a mode changeover switch 92 and a connection signal SWC from a connection switch 62 mounted to the power plug 61 and configured to determine whether the power plug 61 is connected with the external power supply 69. The HVECU 70 outputs various control signals, for example, control signals to the charger 60, via the output port. The HVECU 70 is connected with the engine ECU 24, the motor ECU 40 and the battery ECU 52 via the respective communication ports as described above.

In the electrically driven vehicle 20 of the embodiment, a parking range (P range) used for parking, a reverse range (R range) for reverse driving, a neutral range (N range), and a standard drive range (D range) for forward driving, as well as a brake range (B range) that has identical settings of driving force and the like in an accelerator-on state with the settings in the D range but has a larger setting of braking force that is to be applied to the vehicle in an accelerator-off state during driving than the setting in the D range and a sequential shift range (S range) including an upshift instruction range and a downshift instruction range are provided as the shift position SP of the shift lever 81.

The electrically driven vehicle 20 of the embodiment having the above configuration is driven by hybrid drive (HV drive) or by motor drive (EV drive) in a CD (charge depleting) mode or in a CS (charge sustaining) mode. The CD mode is a mode that gives priority to the EV drive, compared with the CS mode. The CS mode is a mode that uses the HV drive and the EV drive in combination such that the state of charge SOC of the battery 50 is kept at a predetermined target rate. The HV drive causes the electrically driven vehicle 20 to be driven with operation of the engine 22. The EV drive causes the electrically driven vehicle 20 to be driven without operation of the engine 22.

According to the embodiment, when the electrically driven vehicle 20 is at stop with system-off (system stop) at a charging point, for example, at home or at a charging station, in response to connection of the power plug 61 with the external power supply 69, the HVECU 70 controls the charger 60 to charge the battery 50 using electric power from the external power supply 69. When the state of charge SOC of the battery 50 is higher than a threshold value Shv1 (for example, 45%, 50% or 55%) at the time of system-on (system start), the electrically driven vehicle 20 is driven in the CD mode until the state of charge SOC of the battery 50 becomes equal to or lower than a threshold value Shv2 (for example, 25%, 30% or 35%). The electrically driven vehicle 20 is driven in the CS mode until system-off after the state of charge SOC of the battery 50 becomes equal to or lower than the threshold value Shv2. When the state of charge SOC of the battery 50 is equal to or lower than the threshold value Shv1 at the time of system-on, on the other hand, the electrically driven vehicle 20 is driven in the CS mode until system-off. When the mode changeover switch 92 is operated during driving of the electrically driven vehicle 20 in the CD mode, the electrically driven vehicle 20 starts driving in the CS mode. When the mode changeover switch 92 is operated again during driving of the electrically driven vehicle 20 in the CS mode in response to an operation of the mode changeover switch 92, the electrically driven vehicle 20 starts driving in the CD mode.

Figure 2:
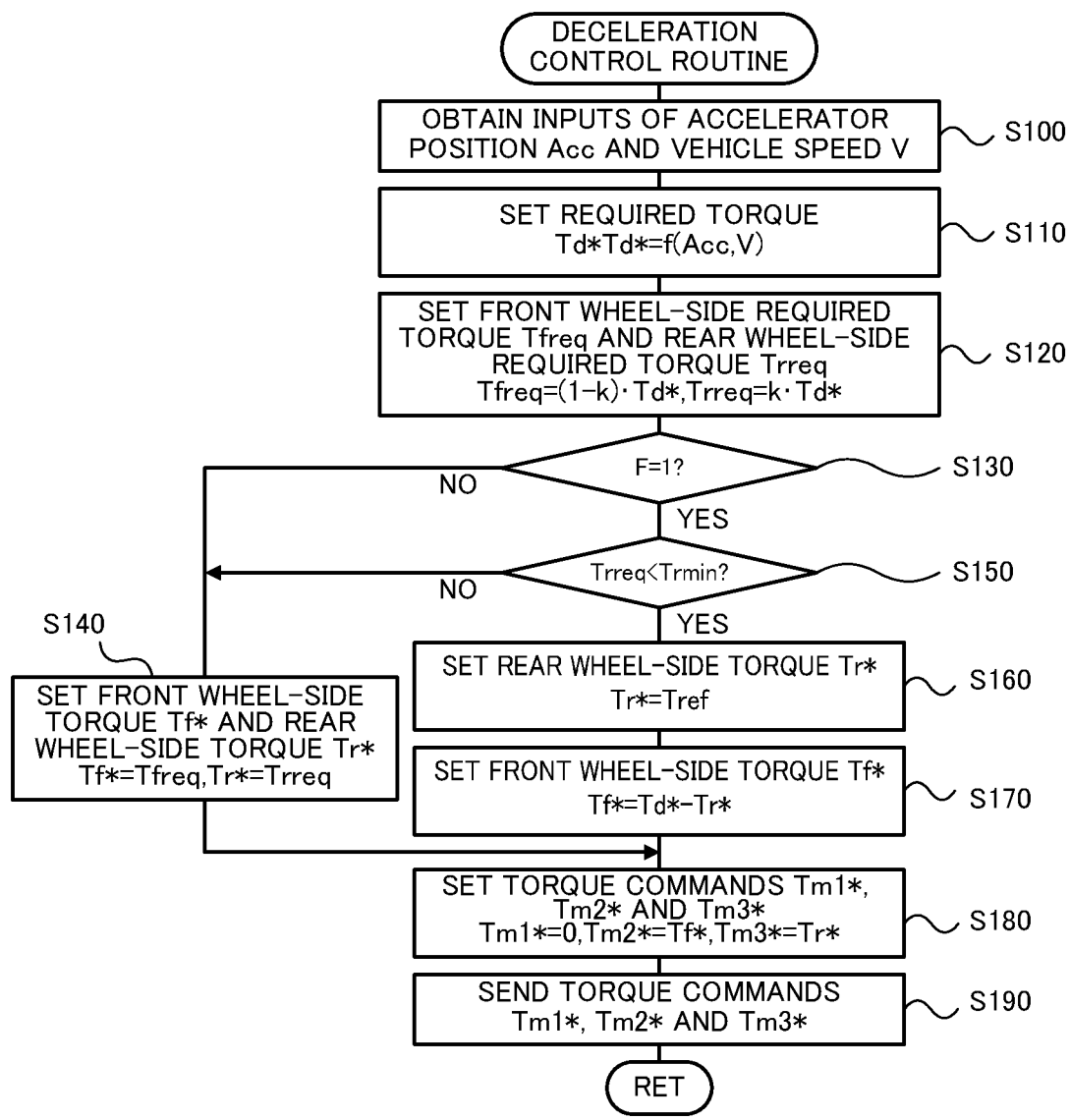
FIG. 2 is a flowchart showing one example of a deceleration control routine performed by an HVECU.

The following describes the operations of the electrically driven vehicle 20 of the embodiment having the above configuration or more specifically a series of operations for deceleration drive in response to a release of the accelerator pedal during driving in the CD mode that gives priority to the EV drive and a series of operations for acceleration drive in response to a subsequent depression of the accelerator pedal. FIG. 2 is a flowchart showing one example of a deceleration control routine performed by the HVECU 70. This routine is repeatedly performed at predetermined time intervals (for example, every several msec or every several ten msec) in response to a request for deceleration drive by a release of the accelerator pedal 83 during driving.

Figure 3:
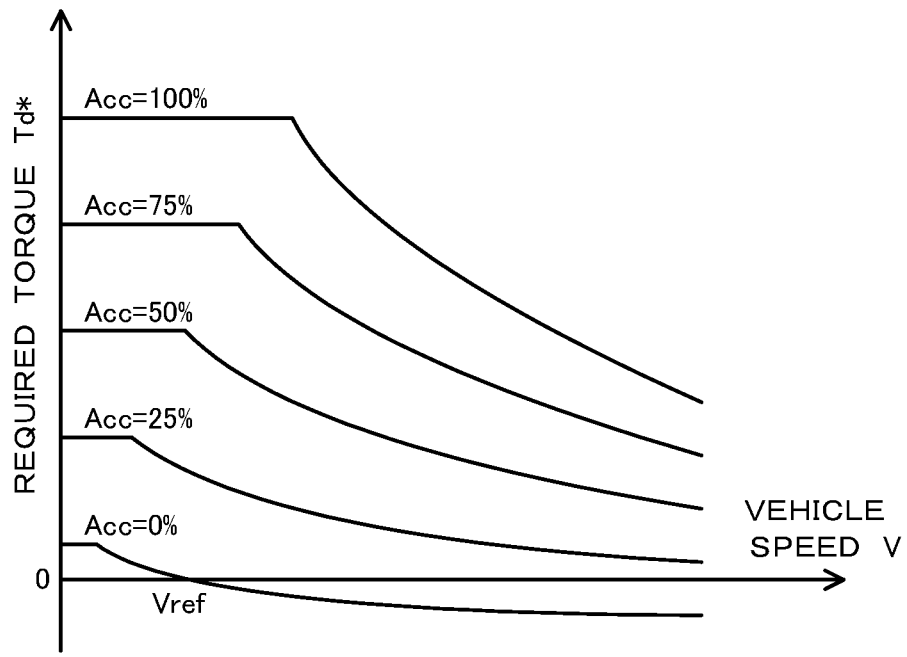
FIG. 3 is a diagram illustrating one example of a required torque setting map.
Figure 4:
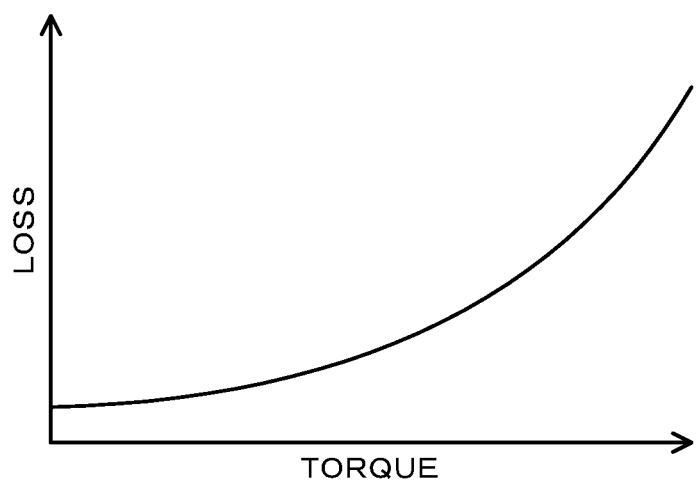
FIG. 4 is a characteristic chart illustrating one example of a relationship between the output torque of a motor and the loss of the motor.

When the deceleration control routine is triggered, the HVECU 70 first obtains the inputs of the accelerator position Acc and the vehicle speed V (step S100) and sets a required torque Td* based on the input accelerator position Acc and the input vehicle speed V (step S110). The required torque Td* is set according to a required torque setting map illustrated in FIG. 3. As illustrated, the required torque Td* is set to increase with an increase in the accelerator position Acc. At the accelerator position of 0% during driving, a torque of a negative value, i.e., a braking force, is set as the required torque Td*. The HVECU 70 subsequently sets a product of the required torque Td* and a driving force distribution ratio k to a rear wheel-side required torque Trreq that is a torque to be output from the motor MG3 and sets a product of the required torque Td* and a value obtained by subtracting the driving force distribution ratio k from the value 1 to a front wheel-side required torque Tfreq that is a torque to be output from the motor MG2 (step S120). According to the embodiment, the driving force distribution ratio k denotes a distribution ratio to the rear wheels 38*c* and 38*d*: k=0 indicates distribution of 100% to the front wheels 38*a* and 38*b* and 0% to the rear wheels 38*c* and 38*d*; and k=1 indicates distribution of 0% to the front wheels 38*a* and 38*b* and 100% to the rear wheels 38*c* and 38*d*. The driving force distribution ratio k is set, for example, to minimize the sum of losses of the motor MG2 and the motor MG3. FIG. 4 is a characteristic chart illustrating one example of a relationship between the output torque of a motor and the loss of the motor. In general, the loss of the motor increases with an increase of the output torque of the motor. Accordingly, distributing the torque that is to be output from the motor MG2 and the motor MG3 such as to minimize the sum of the loss of the motor MG2 and the loss of the motor MG3 minimizes the total loss of the system. In the case where the motor MG2 or the motor MG3 is under driving restriction due to overheat or the like, the driving force distribution ratio k is set to minimize the sum of the losses of the motor MG2 and the motor MG3 in the range of the driving restriction. The HVECU 70 subsequently determines whether a driving force offset control flag F is set to a value 1 (step S130). The driving force offset control flag F indicates permission or prohibition of driving force offset control described later. The setting of the value 1 indicates permission of the driving force offset control, and the setting of a value 0 indicates prohibition of the driving force offset control. When it is determined that the driving force offset control flag F is not set to the value 1 but is set to the value 0, the HVECU 70 does not perform the driving force offset control and sets the front wheel-side required torque Tfreq to a front wheel-side torque Tf* and sets the rear wheel-side required torque Trreq to a rear wheel-side torque Tr* (step S140). The HVECU 70 subsequently sets a value 0 to a torque command Tm1* of the motor MG1, sets the front wheel-side torque Tf* to a torque command Tm2* of the motor MG2, and sets the rear wheel-side torque Tr* to a torque command Tm3* of the motor MG3 (step S180). The HVECU 70 sends the torque commands Tm1*, Tm2* and Tm3* to the motor ECU 40 (step S190) and then terminates this routine. When receiving the torque commands Tm1*, Tm2* and Tm3*, the motor ECU 40 performs switching control of the switching elements included in the respective inverters 41, 42 and 43 such as to drive the motors MG1, MG2 and MG3 with the torque commands Tm1*, Tm2* and Tm3*.

When it is determined that the driving force offset control flag F is set to the value 1, on the other hand, the HVECU 70 performs the driving force offset control. In the driving force offset control, the HVECU 70 first determines whether the rear wheel-side required torque Trreq is lower than a lower limit torque Trmin that is a positive value torque slightly larger than the value 0 (step S150). When it is determined that the rear wheel-side required torque Trreq is equal to or higher than the lower limit torque Trmin, the HVECU 70 sets the front wheel-side required torque Tfreq to the front wheel-side torque Tf* and sets the rear wheel-side required torque Trreq to the rear wheel-side torque Tr* (step S140). When it is determined that the rear wheel-side required torque Trreq is lower than the lower limit torque Trmin, on the other hand, the HVECU 70 performs a lower limit guarding process to set the lower limit torque Trmin to the rear wheel-side torque Tr* (step S160) and sets a torque obtained by subtracting the rear wheel-side torque Tr* from the required torque Td* to the front wheel-side torque Tf* (step S170). The HVECU 70 subsequently sets the value 0 to the torque command Tm1* of the motor MG1, sets the front wheel-side torque Tf* to the torque command Tm2* of the motor MG2, and sets the rear wheel-side torque Tr* to the torque command Tm3* of the motor MG3 (step S180). The HVECU 70 sends the torque commands Tm1*, Tm2* and Tm3* to the motor ECU 40 (step S190) and then terminates this routine. When receiving the torque commands Tm1*, Tm2* and Tm3*, the motor ECU 40 performs switching control of the switching elements included in the respective inverters 41, 42 and 43 such as to drive the motors MG1, MG2 and MG3 with the torque commands Tm1*, Tm2* and Tm3*. As described above, the driving force offset control controls the motor MG3 such that a torque is output to the driveshaft 36R coupled with the rear wheels 38c and 38d with setting the lower limit torque Trmin that is the positive value torque slightly larger than the value 0 as the lower limit, while controlling the motor MG2 such that a required braking force (required torque Td*) is output to the driveshaft 36F coupled with the front wheels 38a and 38b. The reason for performing the driving force offset control will be described later.

Figure 5:
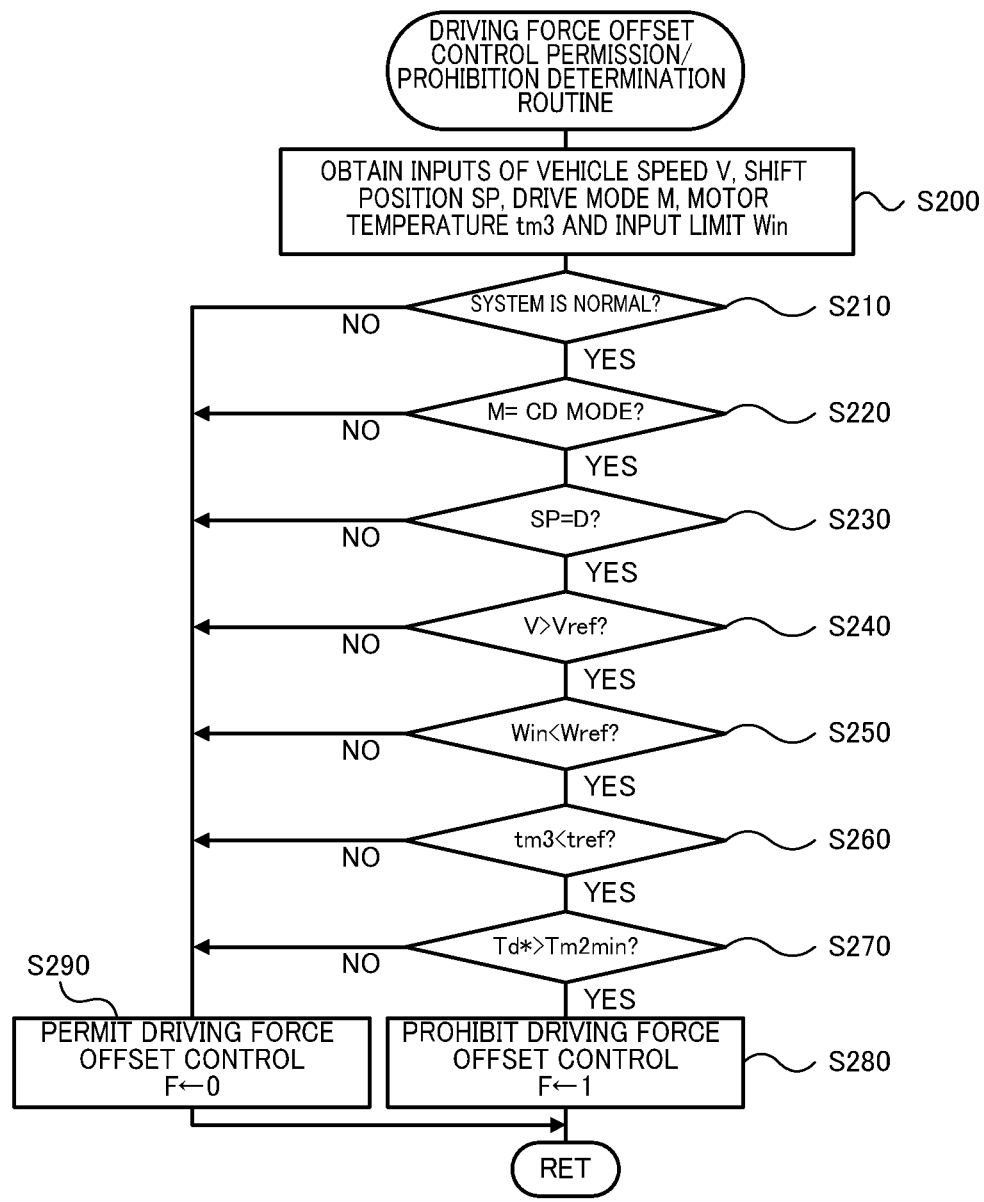
FIG. 5 is a flowchart showing one example of a driving force offset control permission/prohibition determination routine performed by the HVECU.

The following describes a series of processing to determine permission or prohibition of the driving force offset control. FIG. 5 is a flowchart showing one example of a driving force offset control permission/prohibition determination routine performed by the HVECU 70. This routine is repeatedly performed at predetermined time intervals (for example, every several msec or every several ten msec).

When the driving force offset control permission/prohibition determination routine is triggered, the HVECU 70 first obtains the inputs of the vehicle speed V, the shift position SP, a drive mode M, the motor temperature tm3 of the motor MG3 and the input limit Win of the battery 50 (step S200). The HVECU 70 determines whether the system is normal (step S210), determines whether the drive mode M is the CD mode (step S220), determines whether the shift position SP is the D position (step S230), determines whether the vehicle speed V is lower than a predetermined vehicle speed Vref (step S240), determines whether the input limit Win (electric power of a negative value) is less than a predetermined electric power Wref (step S250), determines whether the motor temperature tm3 is lower than a predetermined temperature tref (step S260) and determines whether the required torque Td* is higher than a motor lower limit torque Tm2min of the motor MG2 (step S270). In the case of affirmative answers at all the determinations of steps S210 to S270, the HVECU 70 determines that the current state is suitable for the driving force offset control and sets the value 1 to the driving force offset control flag F to give permission for the driving force offset control (step S280) and then terminates this routine. In the case of a negative answer at any of the determinations of steps S210 to S270, on the other hand, the HVECU 70 determines that the current state is not suitable for the driving force offset control and sets the value 0 to the driving force offset control flag F to prohibit the driving force offset control (step S290) and then terminates this routine. The determination of step S210 includes, for example, determination of whether there is any communication abnormality between the HVECU 70 and the motor ECU 40, i.e., determination of whether the torque commands Tm1*, Tm2* and Tm3* are normally sent from the HVECU 70 to the motor ECU 40. The determination of step S220 aims to perform the driving force offset control only in the CD mode that gives priority to the EV drive and improves the drivability. In the driving force offset control, the front wheels 38a, 38b-side (motor MG2-side) alone takes charge of all the required torque Tr* (torque of a negative value). This increases the total loss of the system, due to the non-linearity of the motor loss, as shown in FIG. 4. In the CS mode that gives priority to keeping the state of charge SOC of the battery 50 over the drivability, the driving force offset control is not performed with importance placed on the efficiency. The determination of step S240 aims not to perform the driving force offset control in a vehicle speed range where a torque of a positive value is set to the required torque Td* at the accelerator position Acc equal to 0%. The predetermined vehicle speed Vref is set to an upper limit vehicle speed in a creep drive range as shown in FIG. 3. The determinations of steps S250 and S260 aim not to perform the driving force offset control when the motor MG3 is under torque restriction. The predetermined electric power Wref is a reference value used to determine whether there is a restriction in charging the battery 50, and the predetermined temperature tref is a reference value used to determine whether the motor MG3 is overheated. The determination of step S270 aims to determine whether all the required torque Td* (torque of a negative value) can be output from the motor MG2. The motor lower limit torque Tm2min may be, for example, a rated torque of a negative value of the motor MG2.

Figure 6:
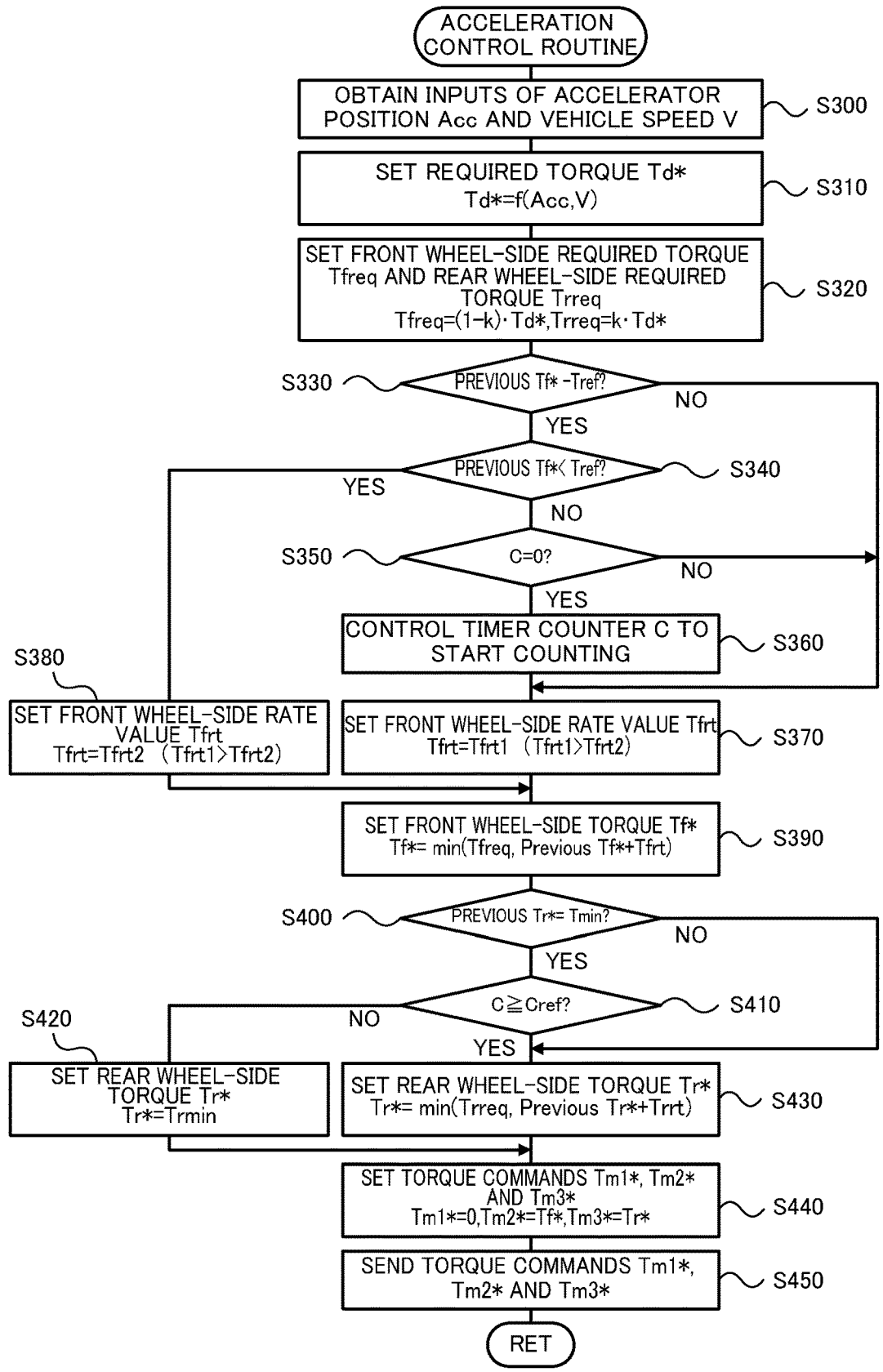
FIG. 6 is a flowchart showing one example of an acceleration control routine performed by the HVECU.

The following describes a series of operations for acceleration drive in response to depression of the accelerator pedal 83 during deceleration drive under the driving force offset control. FIG. 6 is a flowchart showing one example of an acceleration control routine performed by the HVECU 70. This routine is repeatedly performed at predetermined time intervals (for example, every several msec or every several ten msec) in response to a request for acceleration drive by depression of the accelerator pedal 83 during deceleration drive under the driving force offset control.

When the acceleration control routine is triggered, the HVECU 70 obtains the inputs of required data, sets the required torque Td* and sets the front wheel-side required torque Tfreq and the rear wheel-side required torque Trreq (steps S300 to S320), like steps S100 to S120 of the deceleration control routine. The HVECU 70 subsequently determines whether a previous front wheel-side torque (previous Tf*) is equal to or higher than a predetermined torque of a negative value (−Tref) that is slightly smaller than the value 0 (step S330) and determines whether the previous Tf* is lower than a predetermined torque of a positive value Tref that is slightly larger than the value 0 (step S340). These determinations are a process of determining whether the previous front wheel-side torque (previous Tf*) is in a predetermined torque range including the value 0. Immediately after depression of the accelerator pedal 83 during deceleration drive under the driving force offset control, it is generally determined that the previous front wheel-side torque (previous Tf*) is lower than the predetermined torque of the negative value (−Tref). In this case, the HVECU 70 sets a first rate value Tfrt1 that is a relatively large value used at ordinary time, to a front wheel-side rate value Tfrt (step S370) and sets the smaller between the front wheel-side required torque Tfreq and a torque calculated by changing the previous front wheel-side torque (previous Tf*) by the front wheel-side rate value Tfrt toward the front wheel-side required torque Tfreq, to a current front wheel-side torque Tf* (step S390). The HVECU 70 subsequently determines whether a previous rear wheel-side torque (previous Tr*) is equal to the lower limit torque Trmin, i.e., whether the rear wheel-side torque Tr* is being lower limit guarded under the driving force offset control (step S400). When it is determined that the previous rear wheel-side torque (previous Tr*) is equal to the lower limit torque Trmin, the HVECU 70 determines whether a timer counter C is equal to or larger than a predetermined value Cref (step S410). The timer counter C is set to a value 0 as an initial value and starts counting at a timing described later. When it is determined that the timer counter C is not equal to or larger than the predetermined value Cref, the HVECU 70 keeps the rear wheel-side torque Tr* at the lower limit torque Trmin (step S420). After setting the front wheel-side torque Tf* and the rear wheel-side torque Tr*, the HVECU 70 sets the value 0 to the torque command Tm1* of the motor MG1, sets the front wheel-side torque Tf* to the torque command Tm2* of the motor MG2 and sets the rear wheel-side torque Tr* to the torque command Tm3* of the motor MG3 (step S440). The HVECU 70 sends the torque commands Tm1*, Tm2* and Tm3* to the motor ECU 40 (step S450) and terminates this routine.

When it is determined at steps S330 and S340 that the previous front wheel-side torque (previous Tf*) is equal to or higher than the predetermined torque of the negative value (–Tref) and is lower than the predetermined torque of the positive value Tref, i.e., that the pervious front wheel-side torque (previous Tf*) is in the predetermined torque range including the value 0, on the other hand, the HVECU 70 changes the front wheel-side torque Tf* by a gradual changing process. More specifically, the HVECU 70 sets a second rate value Tfrt2 that is smaller than the first rate value Tfrt1, to the front wheel-side rate value Tfrt (step S380) and sets the smaller between the front wheel-side required torque Tfreq and the torque calculated by changing the previous front wheel-side torque (previous Tf*) by the front wheel-side rate value Tfrt toward the front wheel-side required torque Tfreq, to the current front wheel-side torque Tf* (step S390). Changing the front wheel-side torque Tf* by this gradual changing process reduces a torque shock that is likely to occur due to backlash of the differential gear 37F at the time of a change in the sign of the front wheel-side torque Tf* or more specifically at the time of a change from a torque for deceleration to a torque for acceleration. The timer counter C does not start counting, while the front wheel-side torque Tf* is changed by the gradual changing process. The HVECU 70 accordingly determines that the timer counter C is smaller than the predetermined value Cref and keeps the rear wheel-side torque Tr* at the lower limit torque Trmin (steps S400 to S420). The HVECU 70 subsequently sets the value 0 to the torque command Tm1* of the motor MG1, sets the front wheel-side torque Tf* to the torque command Tm2* of the motor MG2 and sets the rear wheel-side torque Tr* to the torque command Tm3* of the motor MG3 (step S440). The HVECU 70 sends the torque commands Tm1*, Tm2* and Tm3* to the motor ECU 40 (step S450) and terminates this routine.

When it is determined at step S340 that the previous front wheel-side torque (previous Tf*) is equal to or higher than the predetermined torque of the positive value Tref, i.e., that the previous front wheel-side torque (previous Tf*) changes from a torque of a negative value through the predetermined torque range including the value 0 to a torque of a positive value, the HVECU 70 determines whether the timer counter C is equal to the initial value (i.e., the value 0) (step S350). When the timer counter C is equal to the initial value, the HVECU 70 controls the timer counter C to start counting (step S360). When the timer counter C is not equal to the initial value, on the other hand, this means that the timer counter C has already started counting. The HVECU 70 accordingly skips the processing of step S360. The HVECU 70 subsequently sets the first rate value Tfrt1 used at the ordinary time to the front wheel-side rate value Tfrt (step S370) and sets the smaller between the front wheel-side required torque Tfreq and the torque calculated by the changing the previous Tf* by the front wheel-side rate value Tfrt toward the front wheel-side required torque Tfreq, to the current front wheel-side torque Tf* (step S390). When it is determined at steps S400 and S410 that the previous rear wheel-side torque (previous tr*) is equal to the lower limit torque Trmin and that the timer counter C is smaller than the predetermined value Cref, the HVECU 70 keeps the current rear wheel-side torque Tr* at the lower limit torque Trmin (step S420). The HVECU 70 subsequently sets the value 0 to the torque command Tm1* of the motor MG1, sets the front wheel-side torque Tf* to the torque command Tm2* of the motor MG2 and sets the rear wheel-side torque Tr* to the torque command Tm3* of the motor MG3 (step S440). The HVECU 70 sends the torque commands Tm1*, Tm2* and Tm3* to the motor ECU 40 (step S450) and terminates this routine. As described above, the timer counter C starts counting at the timing when the front wheel-side torque Tf* is changed from the torque of the negative value (torque for deceleration) through the predetermined torque range including the value 0 to the torque of the positive value (torque for acceleration). Until the timer counter C becomes equal to or larger than the predetermined value Cref, the front wheel-side torque Tf* is increased by the first rate value Tfrt1 that is the relatively large rate value used at the ordinary time, toward the front wheel-side required torque Tfreq, while the rear wheel-side torque Tr* is kept at the lower limit torque Trmin.

When it is determined at step S410 that the timer counter C is equal to or larger than the predetermined value Cref, the HVECU 70 sets the smaller between the rear wheel-side required torque Trreq and a torque calculated by changing the previous rear wheel-side torque (previous Tr*) by a rear wheel-side rate value Trrt that is a relatively large value used at the ordinary time, toward the rear wheel-side required torque Trreq, to the rear wheel-side torque Tr* (step S430). The HVECU 70 subsequently sets the value 0 to the torque command Tm1* of the motor MG1, sets the front wheel-side torque Tf* to the torque command Tm2* of the motor MG2 and sets the rear wheel-side torque Tr* to the torque command Tm3* of the motor MG3 (step S440). The HVECU 70 sends the torque commands Tm1*, Tm2* and Tm3* to the motor ECU 40 (step S450) and terminates this routine. As described above, the rear wheel-side torque Tr* starts increasing toward the rear wheel-side required torque Trreq at the timing when a predetermined time period has elapsed since the change of the front wheel-side torque Tf* from the torque of the negative value (torque for deceleration) through the predetermined torque range including the value 0 to the torque of the positive value (torque for acceleration) (i.e., the timing when the timer counter C becomes equal to or larger than the predetermined value Cref). The predetermined value Cref denotes a time period corresponding to half the period of a vibration (Ff vibration) that is transmitted from the driveshaft 36F to the vehicle body with an increase in the front wheel-side torque Tf* and is a value experimentally or otherwise determined in advance. A vibration (Fr vibration) transmitted from the driveshaft 36R to the vehicle body with an increase in the rear wheel-side torque Tr* has an opposite phase to the phase of the Ff vibration. This causes the Ff vibration and the Fr vibration to be cancelled out each other and thereby suppresses the occurrence of an acceleration shock.

Figure 7:
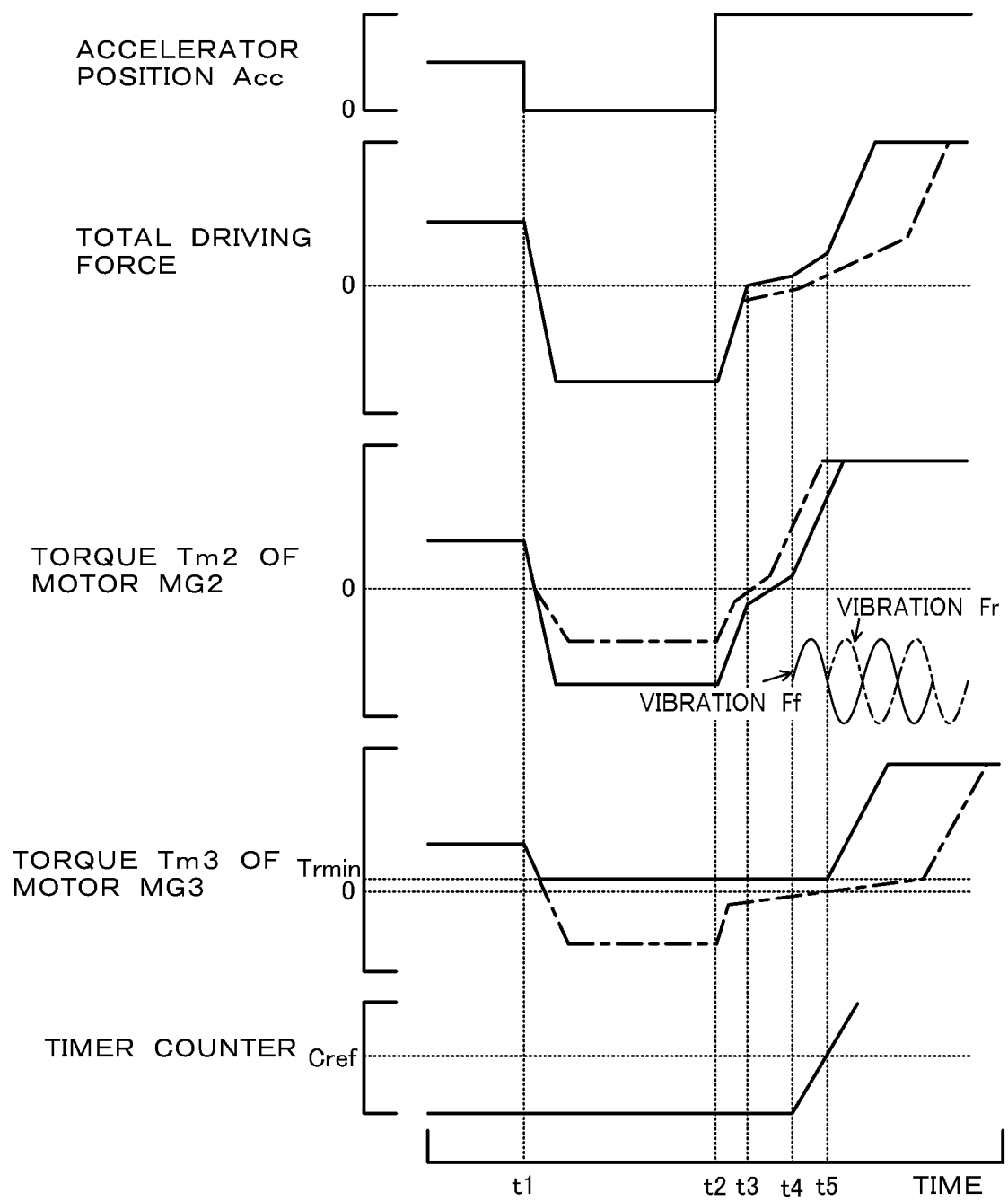
FIG. 7 is a time chart showing one example of time changes of an accelerator position Acc, a total driving force, a torque Tm2 of a motor MG2, a torque Tm3 of a motor MG3 and a timer counter C.

FIG. 7 is a time chart showing one example of time changes of the accelerator position Acc, a total driving force, a torque Tm2 of the motor MG2, a torque Tm3 of the motor MG3 and the timer counter C. Solid line graphs indicate time changes of the embodiment that performs deceleration drive with the driving force offset control and subsequently performs acceleration drive. One dot-chain line graphs indicate time changes of a comparative example that performs deceleration drive without the driving force offset control and subsequently performs acceleration drive. When the accelerator pedal 83 is released at a time t1 during driving in the CD mode to require a torque of a negative value (deceleration drive) as the required torque Td*, the embodiment performs lower limit guarding of the torque of the motor MG3 with the lower limit torque Trmin that is slightly larger than the value 0 and controls the motor MG2 to output the entire required torque Td* (driving force offset control). When the accelerator pedal 83 is then depressed at a time t2 to require a torque of a positive value (acceleration drive) as the required torque Td*, the embodiment changes the torque of the motor MG2 by the gradual changing process, while the torque of the motor MG2 is in the predetermined torque range including the value 0 (for a time period between a time t3 and a time t4). The torque of the motor MG3 is, on the other hand, under lower limit guarding with the lower limit torque Trmin of the positive value that is slightly larger than the value 0 and has no change of the sign. This does not require the gradual changing process and allows for a quick rise of the torque. This accordingly further improves the acceleration response.

The comparative example, on the other hand, causes torques to be output from the motors MG2 and MG3, such that the required torque Td* is continuously output at the driving force distribution ratio k to the driveshafts 36F and 36R. When acceleration drive is required after a requirement for deceleration drive, both the torque of the motor MG2 and the torque of the motor MG3 have changes of the sign. In the electrically driven vehicle 20 of the embodiment, the engine 22 and the motor MG1 are connected via the planetary gear 30 with the driveshaft 36F coupled with the front wheels 38a and 38b. A driveshaft of the lower rigidity is more likely to be employed for the driveshaft 36R which the engine 22 or the like is not connected with, compared with the driveshaft 36F. In order to suppress the occurrence of a torque shock that is likely to occur due to backlash of the differential gear 37R, there is accordingly a need to use a smaller rate value for changing the torque of the motor MG3 in the predetermined torque range including the value 0 than a rate value used for the motor MG2. As a result, even when the torque of the motor MG2 is changed through the predetermined torque range to the torque of the positive value, it takes a long time to change the torque of the motor MG3 through the predetermined torque range to the torque of the positive value. This significantly delays a rise of the torque.

In the electrically driven vehicle 20 of the embodiment, the torque of the motor MG3 is kept at the lower limit torque Trmin until the predetermined time period has elapsed since the change of the torque of the motor MG2 through the predetermined torque range to the torque of the positive value (i.e., until the timer counter C becomes equal to or larger than the predetermined value Cref at a time t5). When the predetermined time period has elapsed since the change of the torque of the motor MG2 to the torque of the positive value, the electrically driven vehicle 20 of the embodiment starts increasing the torque of the motor MG3. The predetermined value Cref is set to the time period corresponding to half the period of the vibration (Ff vibration) transmitted from the driveshaft 36F to the vehicle body with an increase in torque of the motor MG2. The vibration (Fr vibration) transmitted from the driveshaft 36R to the vehicle body with an increase in the torque of the motor MG3 has an opposite phase to the phase of the Ff vibration. This causes the Ff vibration and the Fr vibration to be cancelled out each other and thereby suppresses the occurrence of an acceleration shock.

As described above, in response to a requirement for a torque of a negative value as the required torque Td*, the electrically driven vehicle 20 of the embodiment performs the driving force offset control that controls the motor MG3 to output the torque with the lower limit torque Trmin of the positive value set as the lower limit. This does not require the torque of the motor MG3 to be processed by the gradual changing process to suppress the occurrence of a torque shock that is likely to occur due to backlash of the differential gear 37R, and thereby allows for a quick rise of the torque output from the motor MG3. As a result, this improves the acceleration response to an accelerator operation. This configuration also enables the negative torque (braking force) output from the motor MG2 to respond to the required torque Td* of the negative value.

In response to a requirement for acceleration drive during deceleration drive under the driving force offset control, the electrically driven vehicle 20 of the embodiment starts increasing the torque of the motor MG3 at the timing when the predetermined time period has elapsed since the change of the torque output from the motor MG2 from the torque of the negative value through the predetermined torque range including the value 0 to the torque of the positive value, in order to cause the vibration that is likely to occur with an increase in the torque of the motor MG2 and the vibration that is likely to occur with an increase in the torque of the motor MG3 to have opposite phases to each other. This causes the the vibration that is likely to occur with an increase in the torque output from the motor MG2 to be cancelled out by the vibration that is likely to occur with an increase in the torque output from the motor MG3 and thereby suppresses the occurrence of an acceleration shock.

In response to a requirement for acceleration drive during deceleration drive under the driving force offset control, the electrically driven vehicle 20 of the embodiment keeps the rear wheel-side torque Tr* at the lower limit torque Trmin of the positive value until elapse of the predetermined time period (predetermined value Cref) since the change of the front wheel-side torque Tf* from the torque of the negative value through the predetermined torque range to the torque of the positive value, and starts increasing the rear wheel-side torque Tr* at the timing when the predetermined time period has elapsed. A modification may start increasing the rear wheel-side torque Tr* at the timing when the front wheel-side torque Tf* is changed from the torque of the negative value through the predetermined torque range to the torque of the positive value, may keep the front wheel-side torque Tf* at an upper limit torque of the predetermined torque range, and may start increasing the front wheel-side torque Tf* at the timing when the predetermined time period has elapsed (predetermined value Cref). Another modification may immediately start increasing the front wheel-side torque Tf* and the rear wheel-side torque Tr* in response to a requirement for acceleration drive during deceleration drive under the driving force offset control. In this modification, the front wheel-side torque Tf* has a change of the sign and is accordingly changed by the gradual changing process in the predetermined torque range including the value 0, whereas the rear wheel-side torque Tr* has no change of the sign and is thus allowed to immediately increase without the gradual changing process. This modification allows for a quick rise of the driving force toward the required torque Td* with a slight acceleration shock and further improves the acceleration response.

The electrically driven vehicle 20 of the embodiment gives permission for the driving force offset control upon satisfaction of all the conditions that the system is normal, that the drive mode M is the CD mode, that the shift position SP is the D position, that the vehicle speed V is lower than the predetermined vehicle speed Vref, that the input limit Win is less than the predetermined electric power Wref, that the motor temperature tm3 is lower than the predetermined temperature tref and that the required torque Td* is higher than the motor lower limit torque Tm2min. According to a modification, part of the conditions described above may be omitted, or new conditions different from the conditions described above may be added.

The electrically driven vehicle 20 of the embodiment is equipped with the charger 60 configured to charge the battery 50 by connection of the power plug 61 with the external power supply 69. According to a modification, an electrically driven vehicle may be equipped with a charger configured to charge the battery 50 by receiving electric power in a contactless manner from the external power supply 69. According to another modification, an electrically driven vehicle (hybrid vehicle) may not be equipped with a charger that uses an external power supply for charging.

The electrically driven vehicle 20 of the embodiment is configured such that the engine 22, the motor MG1 and the motor MG2 are connected with the driveshaft 36F coupled with the front wheels 38a and 38b and that the motor MG3 is connected with the driveshaft 36R coupled with the rear wheels 38c and 38d. According to a modification, an electrically driven vehicle may be configured such that the engine 22, the motor MG1 and the motor MG2 are connected with a driveshaft coupled with rear wheels and that the motor MG3 is connected with a driveshaft coupled with front wheels. In this modification, the front wheel-side torque Tf* may be set to the torque command Tm3* of the motor MG3 and the rear wheel-side torque Tr* may be set to the torque command Tm2* of the motor MG2 in the deceleration control routine of FIG. 2 or in the acceleration control routine of FIG. 6. The driving force offset control may perform lower limit guarding of the front wheel-side torque Tf* with a lower limit torque of a positive value that is slightly larger than the value 0, relative to the front wheel-side required torque Tfreq.

Figure 8:
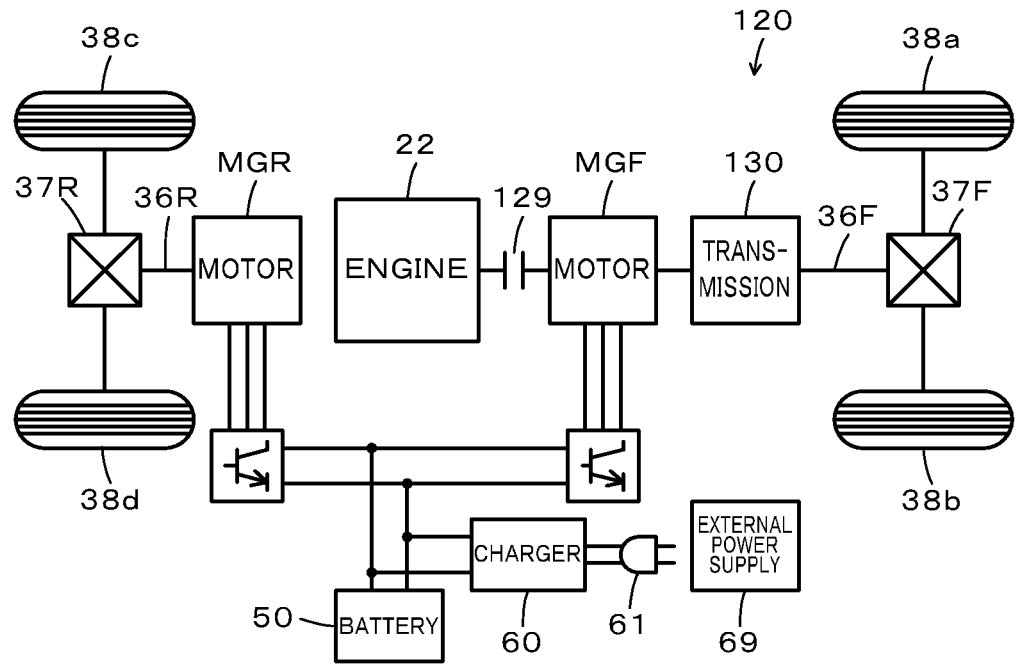
FIG. 8 is a configuration diagram illustrating the schematic configuration of an electrically driven vehicle according to a modification.
Figure 9:
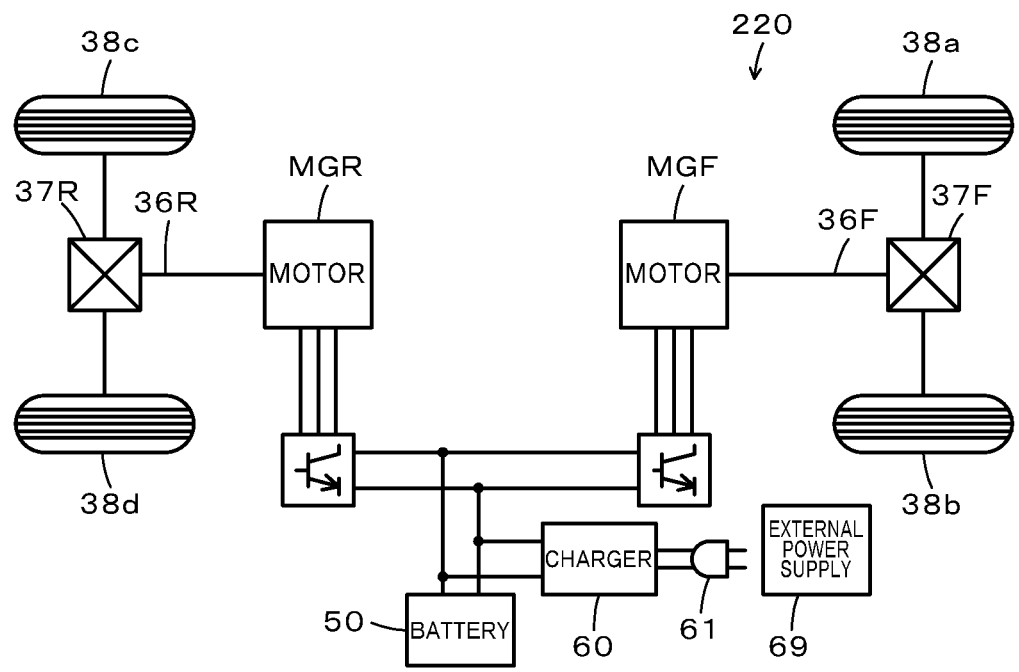
FIG. 9 is a configuration diagram illustrating the schematic configuration of an electrically driven vehicle according to another modification.

In the electrically driven vehicle 20 of the embodiment, the engine 22, the motor MG1 and the driveshaft 36F coupled with the front wheels 38a and 38b are connected with the planetary gear 30, the motor MG2 is connected with the driveshaft 36F, and the motor MG3 is connected with the driveshaft 36R coupled with the rear wheels 38c and 38d. The present disclosure is also applicable to an electrically driven vehicle 120 of a modification configured such that a motor MGF is connected via a transmission 130 with a driveshaft 36F coupled with front wheels 38a and 38b, that an engine 22 is connected via a clutch 129 with a rotating shaft of the motor MGF and that a motor MGR is connected with a driveshaft 36R coupled with rear wheels 38c and 38d as shown in FIG. 8. The present disclosure is also applicable to an electrically driven vehicle 220 of another modification configured such that a motor MGF is connected with a driveshaft 36F coupled with front wheels 38a and 38b and that a motor MGR is connected with a driveshaft 36R coupled with rear wheels 38c and 38d as shown in FIG. 9.

As described above, an electrically driven vehicle according to the present disclosure comprises a first motor configured to output a driving force to one of front wheels and rear wheels; a second motor configured to output a driving force to the other of the front wheels and the rear wheels; a power storage device configured to transmit electric power to and from the first motor and the second motor; and a control device configured to control the first motor and the second motor such that the electrically driven vehicle is driven with a required driving force that is required for driving. In response to a request for a negative driving force as the required driving force, the control device performs driving force offset control to control the second motor with a predetermined positive driving force as a lower limit and to control the first motor such that the electrically driven vehicle is driven with the required driving force.

The electrically driven vehicle of the present disclosure is provided with the first motor configured to output the driving force to one of the front wheels and the rear wheels and with the second motor configured to output the driving force to the other of the front wheels and the rear wheels. In response to a request for a negative driving force (braking force) as the required driving force, the electrically driven vehicle performs the driving force offset control to control the second motor with the predetermined positive driving force as the lower limit and to control the first motor such that the electrically driven vehicle is driven with the required braking force. When the required driving force is changed from a negative driving force to a positive driving force, this configuration does not require a gradual change process to eliminate a backlash of a gear between the second motor and the wheels and allows for a quick rise of the driving force output from the second motor. As a result, this improves the acceleration response to an accelerator operation. This configuration also enables the negative driving force (braking force) output from the first motor to respond to a negative required driving force.

In the electrically driven vehicle of the above aspect, the control device may perform the driving force offset control when an abnormality occurs in a system. Upon the occurrence of an abnormality in the system, this configuration prevents the vehicle from being driven with an unexpected driving force.

The electrically driven vehicle of the above aspect may further include an engine configured to output power to the one of the front wheels and the rear wheels, the electrically driven vehicle being driven with changing over a drive mode between a CD or charge depleting mode and a CS or charge sustaining mode. The control device may not perform the driving force offset control in the CS mode. When the required driving force is a negative driving force, i.e., a braking force, the configuration that causes all the required braking force to be output from the first motor has a higher total loss of the system due to the non-linearity of the motor loss, compared with a configuration that causes the required braking force to be output from the first motor and the second motor in a distributive manner. Accordingly, the driving force offset control is performed in the CD mode that gives priority to the drivability (acceleration response) over keeping the state of charge of the power storage device, while not being performed in the CS mode that gives priority to keeping the state of charge of the power storage device.

This configuration performs the respective controls suitable for the CD mode and for the CS mode.

In the electrically driven vehicle of the above aspect, the control device may not perform the driving force offset control when a maximum charging power that is chargeable into the power storage device is less than a predetermined electric power, when temperature of the second motor is equal to or higher than a predetermined temperature or when vehicle speed is lower than a predetermined vehicle speed.

In the electrically driven vehicle of the above aspect, in response to a requirement for acceleration drive during deceleration drive under the driving force offset control, the control device may control the first motor and the second motor to start increasing the driving force at different timings, such that a vibration that is likely to occur with an increase in driving force of the first motor and a vibration that is likely to occur with an increase in driving force of the second motor have opposite phases to each other. This configuration causes the vibration that is likely to occur with an increase in the driving force output from the first motor and the vibration that is likely to occur with an increase in the driving force output from the second motor to be cancelled out each other and thereby suppresses the occurrent of an acceleration shock.

The following describes the correspondence relationship between the primary elements of the above embodiment and the primary elements of the disclosure described in Summary. The motor MG2 of the embodiment corresponds to the "first motor", the motor MG3 corresponds to the "second motor", the battery 50 corresponds to the "power storage device", and the HVECU 70, the engine ECU 24 and the motor ECU 40 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of electrically driven vehicles.

The invention claimed is:

1. An electrically driven vehicle, comprising:
   a first motor configured to output a driving force to one of front wheels and rear wheels;
   a second motor configured to output a driving force to the other of the front wheels and the rear wheels;
   a power storage device configured to transmit electric power to and from the first motor and the second motor; and
   a control device configured to control the first motor and the second motor such that the electrically driven vehicle is driven with a required driving force that is required for driving, wherein
   when a negative driving force is required as the required driving force, the control device performs driving force offset control to control the second motor with a predetermined positive driving force as a lower limit and to control the first motor such that the electrically driven vehicle is driven with the required driving force.

2. The electrically driven vehicle according to claim 1, wherein the control device performs the driving force offset control when an abnormality occurs in a system.

3. The electrically driven vehicle according to claim 1, further comprising:
   an engine configured to output power to the one of the front wheels and the rear wheels,
   the electrically driven vehicle being driven with changing over a drive mode between a CD or charge depleting mode and a CS or charge sustaining mode, wherein
   the control device does not perform the driving force offset control in the CS mode.

4. The electrically driven vehicle according to claim 1, wherein the control device does not perform the driving force offset control when a maximum charging power that is chargeable into the power storage device is less than a predetermined electric power, when temperature of the second motor is equal to or higher than a predetermined temperature or when vehicle speed is lower than a predetermined vehicle speed.

5. The electrically driven vehicle according to claim 1, wherein in response to a requirement for acceleration drive during deceleration drive under the driving force offset control, the control device controls the first motor and the second motor to start increasing the driving force at different timings, such that a vibration that is likely to occur with an increase in driving force of the first motor and a vibration that is likely to occur with an increase in driving force of the second motor have opposite phases to each other.

* * * * *